Figure 1:
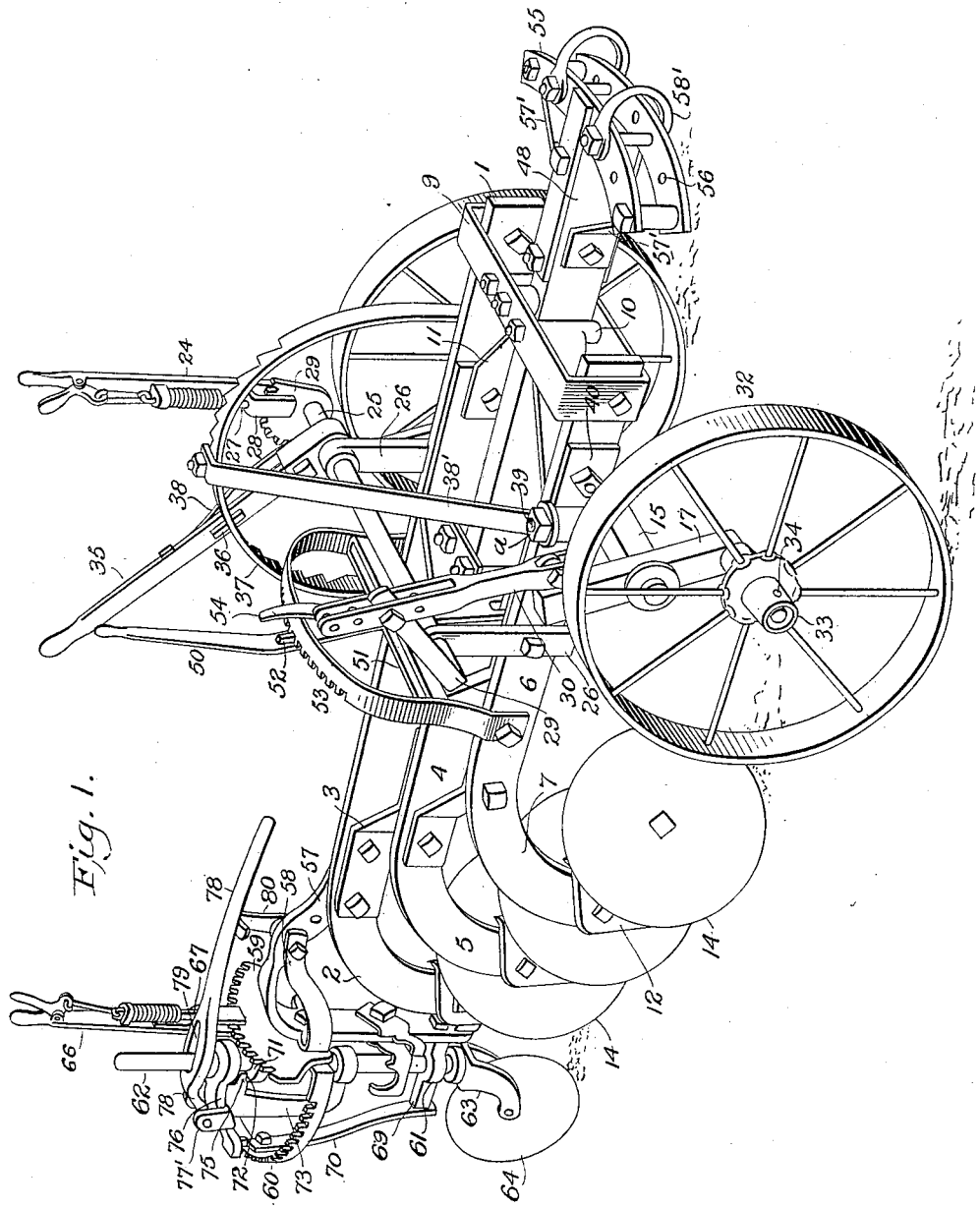

(No Model.)   4 Sheets—Sheet 1.

M. C. DETHLEFS.
HILLSIDE CULTIVATOR OR PLOW.

No. 606,001. Patented June 21, 1898.

Witnesses
James F. Duhamel
Victor J. Evans

Inventor,
MARX C. DETHLEFS,
by John Wedderburn.
Attorney

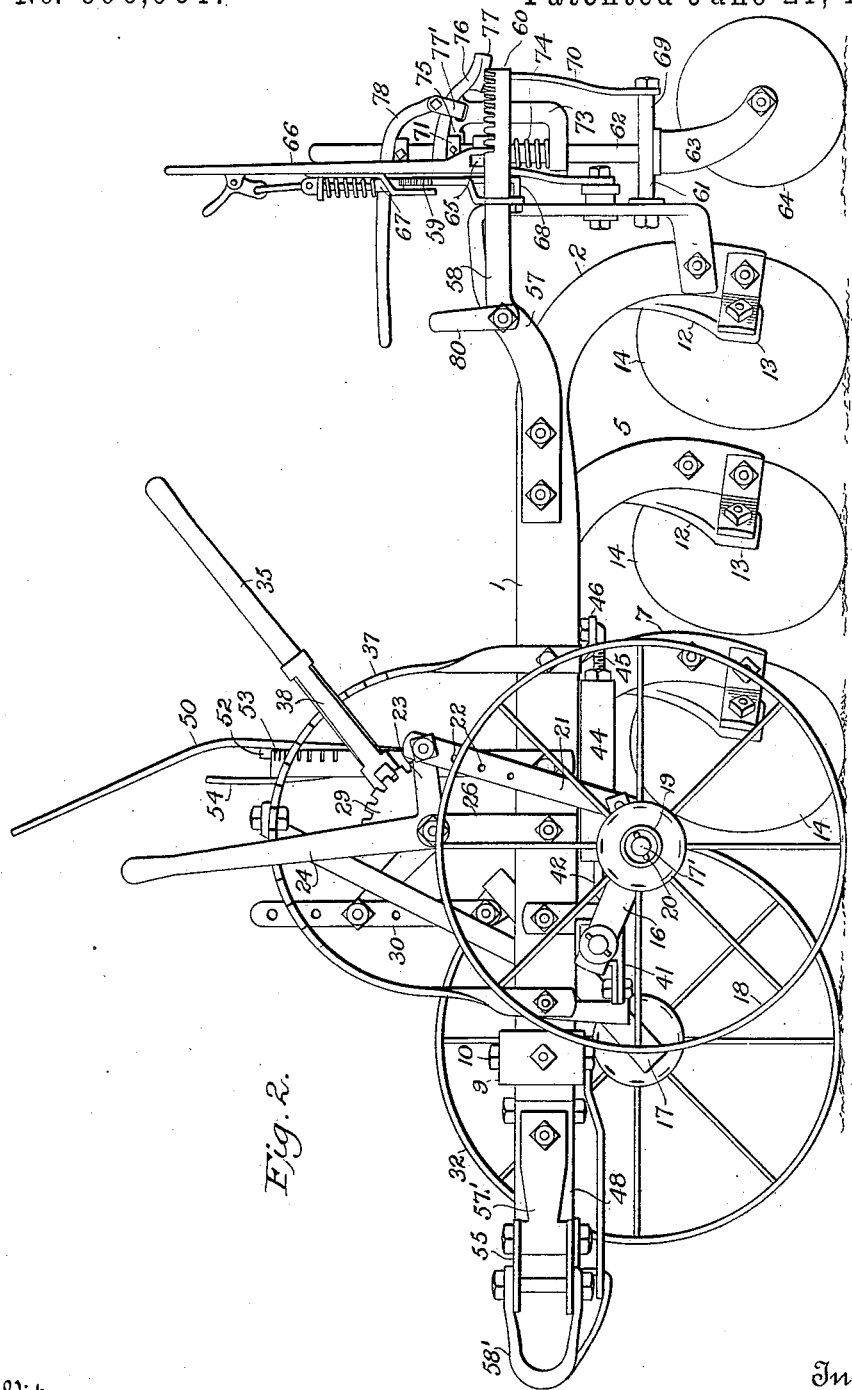

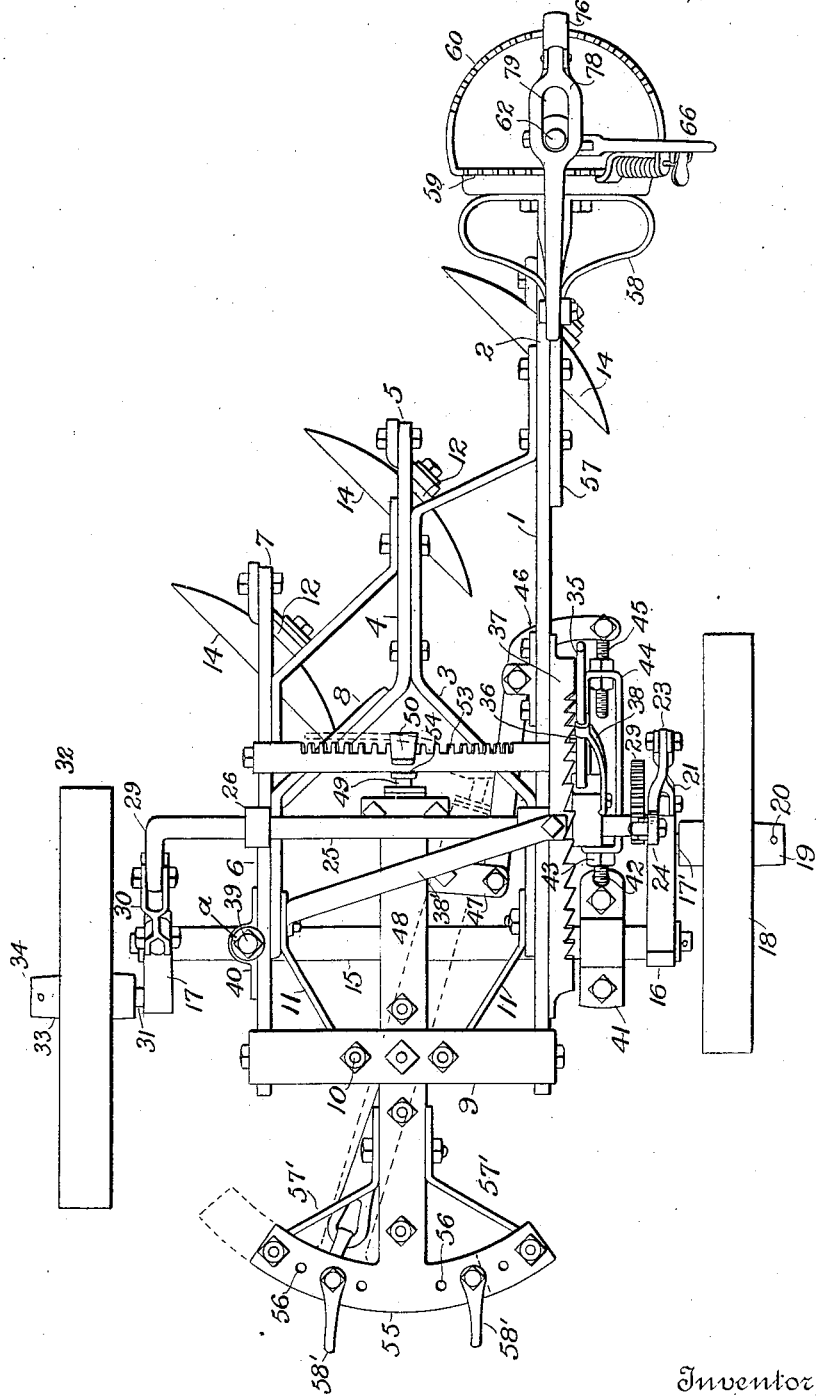

(No Model.) 4 Sheets—Sheet 4.
M. C. DETHLEFS.
HILLSIDE CULTIVATOR OR PLOW.
No. 606,001. Patented June 21, 1898.
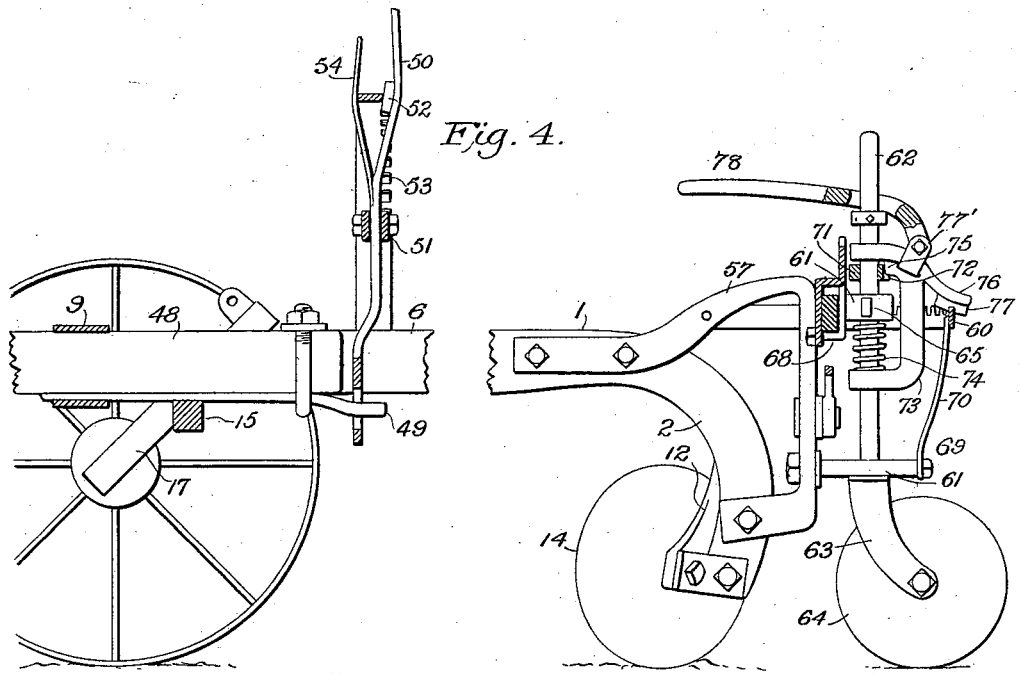
Witnesses
James F. Duhamel
Victor J. Evans
Inventor,
MARX C. DETHLEFS,
By John Wedderburn.
Attorney

UNITED STATES PATENT OFFICE.

MARX CLAUSYEN DETHLEFS, OF WILLOW, CALIFORNIA.

HILLSIDE CULTIVATOR OR PLOW.

SPECIFICATION forming part of Letters Patent No. 606,001, dated June 21, 1898.

Application filed August 14, 1897. Serial No. 648,313. (No model.)

*To all whom it may concern:*

Be it known that I, MARX CLAUSYEN DETHLEFS, of Willow, in the county of Glenn and State of California, have invented certain new and useful Improvements in Hillside Cultivators or Plows; and I do hereby declare the following to be a full, clear, and exact description of the invention, such as will enable others skilled in the art to which it appertains to make and use the same.

This invention relates to a hillside-plow or a plow adapted to be adjusted to sustain an equal penetration irrespective of the condition of the ground over which it travels; and it consists, essentially, of mechanism for changing the line of draft, tipping or elevating the frame or swinging it, as well as means for regulating the trailer to permit cultivation close to a fence or within a corner and also to permit the machine to be easily and readily turned without dragging.

The invention further consists of the details of construction and arrangement of the several parts which will be more fully hereinafter described and claimed.

The object of the invention is to arrange in one machine a series of devices for controlling the operation of the several parts relatively to inequalities in the ground or for side-hill work, which are easily and readily operated and can be manufactured and sold at a comparatively small cost.

In the accompanying drawings, Figure 1 is a perspective view of a machine embodying the invention. Fig. 2 is a side elevation of the machine. Fig. 3 is a top plan view showing a portion of the devices in dotted lines to illustrate a change of adjustment. Fig. 4 is a section on the line $x\ x$, Fig. 1. Fig. 5 is a rear end elevation.

Referring to the drawings, wherein similar numerals of reference are employed to indicate corresponding parts in the several views, the numeral 1 designates a longitudinally-disposed frame-bar having a rear downwardly-curved end 2, and attached thereto is a horizontally-disposed arch or space strap 3, to which a bar 4 is rigidly secured, and is also formed with a downwardly-curved rear end 5. The front end of the said bar 4 extends toward the opposite side at an angle of inclination and is firmly attached to a bar 6, which is also curved downwardly at its rear end, as at 7, and has the front end projecting forwardly in a longitudinal direction and parallel with the bar 1. The bar 6 is braced to the bar 4 by means of a strap-brace 8, and at the front the two ends of the bars 1 and 6 are united by a rectangular brace 9, having a pair of bolts or rods 10 extending vertically therethrough and spaced apart, and from the said rods or bolts strap-braces 11 project rearwardly and are connected to the inner side of the said bars 1 and 6. The rear downwardly-curved ends 2, 5, and 7 of the bars 1, 4, and 6 have shoes 12 removably connected thereto and formed with oblique faces 13, against which disk plows or cultivators 14 are secured. The number of the bars 1, 4, and 6 may be increased, and, if desired, the disk plows or cultivators 14 may have substituted therefor other forms of plows without detracting from the utility or advantages of the invention.

Extending across the front portion of the under side of the bars 1 and 6 is an axle-beam 15, and movably connected to the ends thereof are crank-arms 16 and 17. The crank-arm 16 has a stub-axle 17' projecting therefrom, on which a ground-wheel 18 is rotatably mounted, said ground-wheel being held in connection with the stub-axle 17' by means of a sleeve 19, placed over the outer end of said axle and secured against disengagement by means of a pin 20, removably passing through the said sleeve and axle. To the inner end of the crank-arm 16 a bifurcated link 21 is movably attached and has its upper portion formed with a series of alined openings 22 to adjustably embrace the short arm 23 of a bell-crank lever 24, which is fulcrumed on the end of a rod 25, having bearing in uprights 26 and extending entirely across the machine, the longer member of the bell-crank arm having a spring-actuated dog 27 movably attached thereto and operating through a slotted keeper 28 to engage a toothed segment 29, carried on the rod 25. Through the medium of the said bell-crank lever and the arm 16 the adjacent side of the frame of the machine may be raised or depressed to cant the devices either toward one side or the other. The opposite end of the rod 25 is bent at an angle, as at 29, and is adjustably and movably secured in the upper bifurcated end of a link 30, which is also formed with a series of alined openings and has its lower end movably connected to the rear of the arm 17, pivotally carried on the adjacent end of the axle-beam 15. The said arm 17 projects beyond the axle-beam 15 and has a stub-axle 31 extending outwardly therefrom, which movably receives a groundwheel 32, held against accidental disconnection by a sleeve 33, which is mounted over the outer end of the axle, and a pin 34, removably passing through said sleeve and axle. Secured to the said rod 25 nearer the wheel 18 is an operating-lever 35, which has a tooth 36 projecting from the inner side thereof and is adapted to engage a toothed semicircular strap 37, having its ends connected to and supported by the frame-bar 1. Against the outer side of the operating-lever 35 a spring 38 has bearing and acts to sustain the engagement of the tooth 36 with the teeth of the semicircular strap 37. Through the medium of the adjusting-lever 35 both wheels 18 and 32 may be simultaneously depressed or elevated, and the degree of depression or elevation will depend materially on the primary adjustment of the several parts to accommodate the depth of penetration of the plows and which is made by changing the points of attachment of the several parts with the links connected to the arms 16 and 17. To hold the toothed semicircular strap 37 in rigid position, a brace 38' extends therefrom and downwardly at an angle of inclination and is secured with the same bolt which attaches the brace 11 in the side of the bar 6.

The axle-beam 15 is also adjustable to compensate for wear or to secure a desired result by means of a post 39, which projects upwardly through a clip 40, attached to the outer side of the bar 6. This post 39 projects above the clip 40, and its upper end is threaded and receives a nut $a$, by means of which the part 39 and the axle connected therewith are secured, when adjusted, as required. At its opposite side the said axle-beam has a clip 41 secured thereto and at the rear attached to an eyebolt 42, which has its screw-threaded shank projecting through a nut 43, adjacent to a clamping-loop 44. The opposite end of the said clamping-loop is adjustably engaged by a screw-shank 45, which has its rear end attached to the outwardly-projecting end of a lever 46, pivotally connected to the frame-bar 1. The said clamping-loop will be provided with set-nuts engaging the several parts to attain a positive connection. The opposite end of the lever 46 is attached to an arm 47, which is removably connected to the under side of a draft-beam 48, provided with a rear projection 49, movably mounted in the lower slotted end of an adjusting-lever 50, which extends upwardly through a fulcrum-support 51 and is provided with an engaging tooth 52 to take into teeth 53, formed in the rear adjacent edge of a curved strap connected to the bars 1 and 6 and extending transversely across the machine. The fulcrum-support 51 is attached to the curved strap, and extending upwardly from the adjusting-lever 50 is a guide-arm 54, which always tends to direct the tooth 52 into engagement with the teeth 53 of the strap. By adjusting the said lever 50 the draft-beam 48 and the axle-beam 15, connected therewith by the lever 46 and arm 47, are simultaneously and equally turned in lateral directions or arranged centrally of the machine. By this means the draft-animals can be turned to one side or the other and the plows or cultivators be thereby permitted to work at a point where it would be impracticable for the animals to travel. The said draft-bar 48 swings between the bolts or rods 10, and on the outer end thereof are secured segmental plates 55, which are arranged parallel one above the other and have alined openings 56 therein. These segmental plates are held firmly to the draft-bar 48 by rearwardly-extending braces 57', and adapted to be adjustably mounted in the openings therein are clevises 58', to which a cross-pole and double or single trees may be attached, and by changing the position of the said clevises, as well as adjusting the draft-bar 48 and the axle-beam 15, the line of draft may be varied at will. This right and left adjustment accommodates the machine to be readily used on right and left inclinations, and though the declivity or incline might be steep, yet the machine will be prevented from sliding to too great a degree by throwing the draft-bar and axle-beam at a proper angle and make it easier for the animals to operate the entire device.

In assembling the several parts thus far described it will be understood that suitable bolts and nuts will be employed at all points, and as a further mode of adjustment the uprights 26 have openings therein to accommodate a change of elevation thereof and serve as an auxiliary in attaining an initial adjustment of the said rod 25 and increase or decrease the depression or elevation of the ground-wheels 18 and 32 when the adjusting devices directly connected thereto are actuated. It will also be understood that a tongue may be suitably connected to the draft-bar 48 and supplied with the attachments incidental thereto for hitching the draft-animals.

To the rear of the frame-bar 1 a brace-bar 57 is connected by suitable bolts and extends upwardly at an angle and then downwardly in a vertical plane in rear of the depending curved end of said frame-bar and then forwardly in a horizontal plane and is further secured to the said depending curved portion of the frame-bar. Extending laterally from the said brace-bar 57 are brace-loops 58, constructed of strap metal, and thereto is secured a toothed segment 59, which extends across the rear of the machine in a transverse plane. The said parts also support a horizontally-disposed curved toothed engaging frame 60, and pivotally mounted in upper and lower bearings 61, extending outwardly from the vertical portion of the brace-bar 57 and also from the rear of the said frame 60, is a rotatable post 62, having a lower yoked end 63, in which is pivotally mounted a trailer 64. The upper bearing 61 has a lug 65 projecting therefrom, to which is attached the lower end of a shifting-lever 66, having a spring-actuated dog 67, adapted to engage the teeth of the segment 59, and depending from the front side of the said segment are guides 68, in which the rear part of the frame 60 is adjustably mounted and may be shifted by operating the lever 66 from one side to the other. The lower bearing 61 is movably connected to the vertical portion of the brace-bar 57, and by operating the shifting-lever the trailer is thrown at an angle of inclination toward either one side or the other in view of the fact that the post carrying the same is mounted in the bearing 61, attached to the rear portion of the frame 60, and moves with the latter. Projecting rearwardly from the lower bearing 61 is an extension 69, to which the lower end of an inclined brace 70 is connected, the upper end of said brace being attached to the said rear portion of the frame 60 to establish a rigid arrangement of the said frame. On the post 62 a collar 71 is secured by means of a set-screw and has a slot 72 therein, and also engaging the said post is a yoke 73, having forwardly-extending ends loosely engaging the same, and between the lower end and the upper bearing 61 a coiled spring 74 is located, the said yoke 73 having a tooth 75 located on the front portion thereof, which is adapted to engage the slot 72 in the collar 71. The said yoke also has a rearwardly-extending arm 76 with a flange 77, adapted to engage the teeth in the frame 60, and attached to the upper part of the yoke is a movable link 77', pivotally embracing the rear end of a lever 78, which is formed with a slot 79, through which the said post extends. By depressing the front end of the lever 78 the flange on the arm 76 is disengaged from the teeth of the frame 60, said depression being made against the action of the spring 74, surrounding the post, and which tends to throw the yoke 73 downwardly. When the tooth 75 engages the slot 72 of the collar 71, the trailer 74 is prevented from turning; but as soon as the front end of the lever 78 is depressed and the flange on the arm 76 raised from engagement with the teeth of the frame 60 the said tooth 75 is also disconnected from the said slot 72 of the collar 71, and the trailer may be turned at any desired angle freely and without adjustment, and to hold the said lever 78 in this disengaged position its free end is caused to engage a curved arm 80, attached to one side of the brace-bar 57. Through the medium of this multiple adjustment of the trailer the machine may be guided when irregularly arranged and the cultivating operation ensue without drag or sliding movement.

All the parts of the device may be constructed of suitable material and increased or decreased in size and readily operated without requiring a cessation of movement or of the cultivation being carried on.

The gang-plows may be increased or decreased, as desired, and it is obviously apparent that many minor changes in the details of construction and arrangement of the several parts might be made and substituted for those shown and described without in the least departing from the nature or spirit of the invention.

Having thus described the invention, what is claimed as new is—

1. In a device of the character set forth, the combination of a frame, a longitudinal draft-beam pivoted to the frame and adapted to swing horizontally, a transversely-arranged axle-beam having ground-wheels at its ends and pivoted between its extremities to turn in a horizontal plane, and means for connecting and simultaneously adjusting said draft-beam and axle-beam, substantially as set forth for the purpose described.

2. In a device of the character set forth, the combination of a frame, a draft-beam movably mounted therein, an axle-beam having ground-wheels adjustably carried thereby, means for simultaneously adjusting said draft and axle beams, and apertured segmental plates carried on the outer end of the axle-beam, substantially as described.

3. In a device of the character set forth, the combination of an axle-beam, arms movably mounted on the ends thereof having stub-axles extending therefrom, ground-wheels mounted on said stub-axles, links movably attached to said arms, and a rod adjustably connected to said links, substantially as described.

4. In a device of the character set forth, the combination of an axle-beam, arms movably carried by said axle-beam and having stub-axles projecting therefrom arranged in reverse positions, ground-wheels mounted in said stub-axles, links movably attached to said arms, a rod adjustably connected to one of said links, a lever adjustably connected to the opposite link and adapted to be operated to move one arm independently of the other, and devices attached to said rod for unitedly operating both arms, substantially as and for the purposes specified.

5. In a device of the character set forth, the combination of a frame, an axle-beam adjustably carried thereby, a draft-beam simultaneously movable with said axle-beam, and an adjusting-clamp intermediate of the connections between the said axle-beam and draft-beam to impart an initial adjustment to said axle-beam, substantially as described.

6. In a device of the character set forth, the combination of a frame, a rectangular brace surrounding the front of the frame, posts or bolts mounted in said brace and spaced apart from each other, a draft-beam adjustably carried by said frame and pivoted to the rectangular brace between said posts or bolts, and a lever having connection with the rear portion of the draft-beam for adjusting it laterally and holding it in a located position, substantially as described.

7. In a device of the character set forth, the combination of a frame comprising a series of bars having rear depending curved ends, plows or cultivators attached to said ends, a trailer adjustable laterally and rotatably, an adjustable draft-beam, an adjustable axle-beam having ground-wheels movably attached thereto, and means for adjusting the several parts, substantially as described.

8. In a device of the character set forth, the combination of a frame, an adjustable axle-beam having a post movably engaging a socket on one side of the frame, means for initially adjusting the opposite end of the axle-beam, an adjustable draft-beam, and devices for simultaneously moving said axle and draft beams, substantially as and for the purposes specified.

9. In a device of the character set forth, the combination of a frame, a brace-bar extending rearward from a part of said frame, a toothed segment supported by said brace-bar, a curved toothed frame extending to the rear of said toothed segment, a post movably supported by said brace-bar and segment and carrying a trailer, and means for laterally and rotatably adjusting the said post and trailer, substantially as described.

10. In a device of the character set forth, the combination of a frame, a brace-bar extending rearwardly therefrom, a segment vertically disposed on the said brace-bar, a horizontally-toothed frame movably carried in rear of said segment, a post rotatably mounted in bearings carried by the said brace-bar and toothed frame, and levers for adjusting said devices, substantially as described.

11. In a device of the character set forth, the combination of a frame, a brace-bar extending therefrom, a vertically-disposed toothed segment on said brace-bar having guides, a horizontally-disposed toothed frame movably mounted in said guides and carrying a bearing, another bearing movably carried by the lower part of said brace-bar, a trailer-post rotatably mounted in said bearings adapted to have a lateral adjustment, a shifting-lever attached to the said horizontally-disposed toothed frame and coacting with the said segment, a yoke engaging the post and provided with a rearwardly-extending arm having a flange to engage the teeth of the said toothed frame and also formed with a front tooth, a lever attached to said yoke, a collar secured to the post and having a slot therein adapted to be engaged by the tooth on the yoke, and a spring surrounding the post between a part of the yoke and the upper bearing, susbtantially as described.

12. In a device of the character set forth, the combination of a frame, an axle-beam carried thereby, arms movably mounted on the ends of said axle-beam and having stub-shafts extending from the same in reverse positions, ground-wheels engaging said stub-shafts, and means for simultaneously adjusting both arms and also for individually adjusting one of the arms, substantially as described.

13. In combination, a frame bearing a gang of earth-treating devices, a transversely-disposed axle having its spindle-arms out of line with and relatively loosely connected to the axle and bearing ground-wheels, a transverse rod having an arm in connection with one of the spindle-arms, means for turning the rod and holding it in an adjusted position, a lever loosely mounted upon the opposite end of the said rod and having connection with the other spindle-arm for independent adjustment thereof, and means for connecting the said lever with the rod, whereby after the ground-wheels have been independently adjusted they may be simultaneously moved, substantially as described.

14. In combination, a frame bearing a gang of earth-treating devices, a transversely-disposed axle, crank-arms loosely connected with the ends of the axle and bearing ground-wheels, a rod parallel with the axle, means for adjustably connecting one of the crank-arms with an end portion of the rod, a lever loosely mounted upon the opposite end of the rod and having adjustable connection with the other crank-arm, and means for connecting the lever with the said rod, substantially as described.

15. In combination, a frame bearing a gang of earth-treating devices, a transversely-disposed axle, crank-arms loosely connected with the ends of the axle and bearing ground-wheels, a rod parallel with the axle, and having one end bent, a link adjustably connecting the bent end of the rod with a crank-arm, a toothed segment secured to the opposite end of the rod, a lever loosely mounted upon the rod and having a latch to engage with the toothed segment, and a link adjustably connecting the said lever with the other crank-arm, substantially as specified.

16. In combination, a draft-bar, a gang of earth-treating devices, a transverse bar having pivotal connection with the draft-bar and rigidly attached to the gang, a toothed arched bar secured to the extreme or outer gang-bars, an upright lever fulcrumed to a brace connecting the ends of the arched bar, and having a toothed portion to engage with the teeth of the said arched bar, and means connecting the upright lever with the draft-beam, substantially as described.

17. In combination, a draft-beam, an axle mounted to turn upon a vertical pivot, a lever for turning the draft-beam upon a vertical pivot, a bell-crank lever fulcrumed to the frame and having its longitudinal arm connected with the draft-beam, a clamping-loop adjustably connected with the lateral or transverse arm of the bell-crank lever, and adjustable connections between the said loop and the axle, substantially as and for the purpose specified.

18. In combination, a draft-beam mounted to turn upon a vertical pivot, an axle mounted to swing upon a vertical axis, a bell-crank lever fulcrumed to the frame and having its longitudinal arm connected with the rear end of the draft-beam, a loop, a screw-shank connecting the rear end of the loop with the lateral or transverse arm of the bell-crank lever, and an eyebolt clipped to the aforesaid axle and having its threaded portion making adjustable connection with the front end of the said loop, substantially as and for the purpose described.

In testimony whereof I have signed this specification in the presence of two subscribing witnesses.

MARX CLAUSYEN DETHLEFS.

Witnesses:
P. D. MAUPIN,
E. H. RHODES.